United States Patent [19]

Roehringer

[11] Patent Number: 4,531,602
[45] Date of Patent: Jul. 30, 1985

[54] POWER STEERING SYSTEM

[75] Inventor: Arno Roehringer, Ditzingen, Fed. Rep. of Germany

[73] Assignee: Daimler-Benz Aktiengesellschaft, Stuttgart, Fed. Rep. of Germany

[21] Appl. No.: 510,196

[22] Filed: Jul. 1, 1983

[30] Foreign Application Priority Data

Jul. 5, 1982 [DE] Fed. Rep. of Germany ....... 3225053
Dec. 23, 1982 [DE] Fed. Rep. of Germany ....... 3247745

[51] Int. Cl.³ ............................................. B62D 5/08
[52] U.S. Cl. ..................................... 180/143; 91/434
[58] Field of Search ............... 180/143, 142, 141, 132; 91/434

[56] References Cited

U.S. PATENT DOCUMENTS 2,893,504  7/1959  Jackson ................................. 180/143
3,901,343  8/1975  Inoue ..................................... 180/142
3,924,705 12/1975  Sugisawa ............................. 180/143
4,119,172 10/1978  Yanagishima ...................... 180/142

FOREIGN PATENT DOCUMENTS 1040392  3/1959  Fed. Rep. of Germany .
2356835  7/1974  Fed. Rep. of Germany .
2851773  6/1980  Fed. Rep. of Germany .
2950525  6/1981  Fed. Rep. of Germany .
3122370 12/1982  Fed. Rep. of Germany .
3220922  3/1983  Fed. Rep. of Germany .
1300679 12/1972  United Kingdom .
1302323  1/1973  United Kingdom .
1392079  4/1975  United Kingdom .

Primary Examiner—John A. Pekar
Attorney, Agent, or Firm—Barnes & Thornburg

[57] ABSTRACT

A power steering system operates with a servo-valve, which responds to the wheel angle of a hand steering wheel, for the operating pressure of a steering system servo-motor and with a modulating valve operating as a function of at least one parameter, in particular the travelling speed. The modulating valve produces a reaction pressure dependent on the parameters by reducing an output pressure derived from the operating pressure. A reaction pressure due to the action on a reaction pressure surface embodied at the valve setting element of the control valve and located in a rection pressure chamber can be felt exclusively, as pressure-dependent feedback, at the hand steering wheel, because the reaction pressure chamber is connected to an operating pressure chamber of the steering system servo-motor and the operating pressure chamber via an associated valve connection of the control valve to an operating pressure source, and, at the same time, the modulating valve is inserted, in series with at least one throttle, between the operating pressure source on one side and a pressure medium return, substantially relieved of pressure, on the other side. The reaction pressure chambers, each connected on one side to an operating pressure chamber, are connected to one another on the other side via a short-circuit pressure connection. To avoid quantities of leakage oil via the modulating valve during relatively low travelling speeds, the short-circuit pressure connection contains a throttle in series with the modulating valve. The modulating valve is inserted in the pressure connection between one reaction pressure chamber and the associated operating pressure chamber. At low travelling speeds, the modulating valve blocks the pressure connection.

23 Claims, 3 Drawing Figures

POWER STEERING SYSTEM

BACKGROUND AND SUMMARY OF THE INVENTION

The invention concerns a power steering system of the type which includes a steering servo-motor with a steering assist piston acted on by fluid pressure in respective oppositely facing working chambers and a servo-valve for controlling fluid pressure supply to the working chambers in dependance on the position of a servo-valve adjusting member which is operatively connected to the vehicle hand steering wheel. Reaction pressure chambers at opposite sides of the servo-valve adjusting member are connected by pressure connections to the working chambers to communicate steering feedback to the driver. This type of system includes modulating valve means for modulating the reaction pressure which is communicated back to the steering servo-motor, typically as a function of engine speed.

When parking with a power steering system of this type—i.e. with a high requirement for steering assistance and low travelling speed—large quantities of leakage oil can reach the pressure medium return via the modulating valve while by-passing the steering system servo-motor.

An object of the invention is to so arrange a power steering system of this type that the modulating valve can be in a shut-off position, in which flow through it is prevented, when the travelling speed tends toward zero.

According to one aspect of the invention a modulating valve is arranged in a short-circuit bypass connection between the two reaction chambers and the pressure connections between the reaction chambers and working chambers are continuously open.

In the power steering system according to certain preferred embodiments of the invention, the two reaction pressure chambers of the control valve are short-circuited via the throttle even when the modulating valve is in the shut-off position, so that, on the one hand, quantities of leakage oil are avoided and, on the other hand, the function of the control valve is not adversely affected.

In a known power steering system (German Pat. Specification No. 1,040,392), the modulating valve is inserted between the reaction pressure chamber and the valve connection, associated with the operating pressure chamber, of the control valve, so that two pressure connections are necessary between the modulating valve and the control valve and the unreduced operating pressure of the power steering system arises as the output pressure at the modulating valve during a corresponding steering activity. In this known power steering system, the constructional and spatial requirement for the control valve is also large because the reaction pressure chamber has to be arranged fully independent of the valve connections of the control valve.

In a known power steering system of another type (German Offenlegungsschrift No. 2,851,773), a modulating valve operating as a function of the travelling speed and/or other parameters is, indeed, used to produce a reaction pressure dependent on the parameters but the feedback which can be felt at the hand steering wheel results from a differential pressure brought into effect at the valve setting element by means of additional reaction pressure pistons. This differential pressure is produced from the full operating pressure and the reaction pressure set by the modulating valve, so that the differential pressure which can be felt as the feedback can assume pressure values between zero and the actual value of the operating pressure. In this known power steering system, the arrangement of reaction pressure chamber and piston associated with steering to the right and the arrangement associated with steering to the left are synchronously subjected to pressure, so that special means are necessary to deal with the pressure force of the arrangement not associated with the steering direction being used.

In especially preferred embodiments of the invention, the modulating valve is arranged to shut off the pressure connection at low traveling speeds.

In especially preferred embodiments of the invention, the respective pressure connections which bypass the modulating valve and connect the reaction and operating pressure chambers are provided with a constant throttle and the modulating valve is configured to produce a pressure drop in the reaction pressure chamber at least indirectly relative to a pressure medium return which is substantially relieved of pressure.

In particularly preferred embodiments some of the reaction pressure chambers are located so as to be fixed in position relative to the valve housing of the servo-control valve. Preferred embodiments further include a bypass throttle connection containing a throttle and connection parallel with the modulating valve. In especially preferred embodiments there is provided a valve for limiting the pressure-dependent feedback connected in parallel with the modulating valve.

In certain preferred embodiments a controllable shut-off valve arrangement is connected in parallel with the throttles disposed in the lines connecting the respective reaction and working chambers, which shut-off valve arrangement is located between the modulating valve and the pressure medium return.

In certain preferred embodiments, the reaction pressure chamber is connected to the respective operating pressure chamber via the associated valve connection of the servo-control valve.

Preferred embodiments of the present invention exhibit the following advantages:

(i) only one pressure connection is necessary between the modulating valve and the reaction pressure chamber and a reduced output pressure relative to the operating pressure arises at the modulating valve by means of the throttle;

(ii) it is possible to operate with lower pressure values and flow rates for the reaction pressure due to the throttle inserted between the modulating valve and the pressure medium return;

(iii) no extra reaction pistons are necessary for producing the reaction pressure force;

(iv) the characteristics of the feedback can be modified by a bypass throttle connection, containing a throttle, to the modulating valve;

(v) the feedback can be limited by a valve connected in parallel with the modulating valve;

(vi) the characteristics of the feedback can be modulated by a controllable shut-off valve arrangement, which is connected in parallel with the throttle located between the modulating valve and the pressure medium return;

(vii) the reaction pressure chamber is connected to the operating pressure chamber via the associated valve connection of the control valve;

(viii) the reaction pressure chamber is connected to the associated valve connection of the control valve by means of a pressure duct, which contains the throttle, of the valve setting element;

(ix) the two reaction pressure chambers, each connected on one side to an operating pressure chamber, are connected on the other side to one another by means of a short-circuit pressure connection containing a common modulating valve;

(x) the shut-off valve arrangement is inserted in a pressure duct of the valve setting element of the control valve;

(xi) the throttle, located between the modulating valve and the pressure medium return, is arranged downstream of the valve, for limiting the feedback;

(xii) the valve for limiting the feedback is inserted directly between the reaction pressure chamber and the pressure medium return; and (xiii) the modulating valve is inserted in series with at least one throttle between the operating pressure source, on one side, and a pressure medium return, substantially relieved of pressure, during a steering deflection of the manual steering wheel, the two reaction pressure chambers, each connected on one side to an operating pressure chamber, being connected to one another on the other side by means of a short-circuit pressure connection.

In order to be able to avoid (particularly when parking—i.e. at low travelling speeds) a flow through the modulating valve leading to undesirable leakage quantities, it is also advantageous in the power steering system according to the invention that the short-circuit pressure connection contains the throttle located in series with the modulating valve and the modulating valve is inserted in the pressure connection between one reaction pressure chamber and the associated operating pressure chamber. In this manner, the modulating valve can be closed at low travelling speeds without the control valve being blocked in the process.

Further objects, features, and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
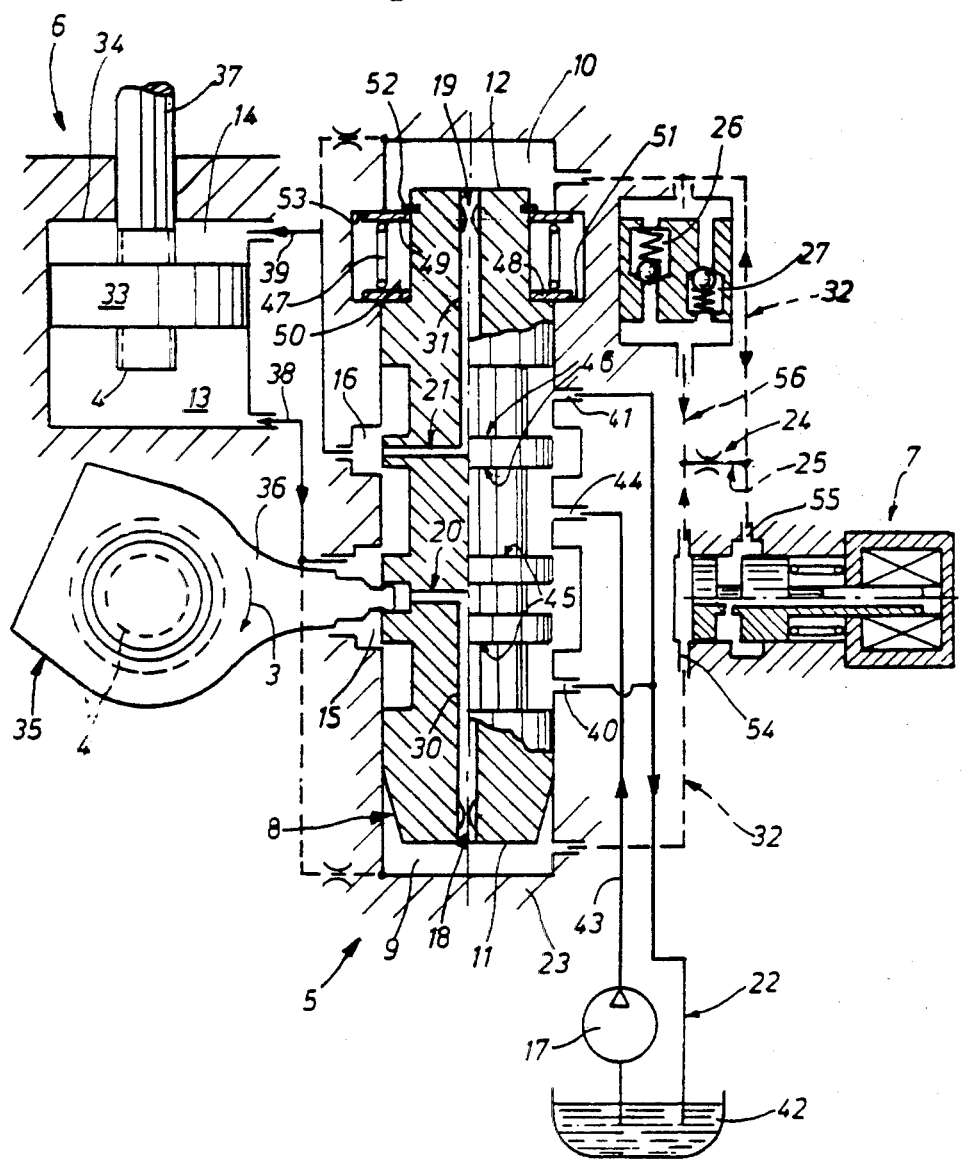
FIG. 1 is a hydraulic block circuit diagram of a power steering system constructed according to a first preferred embodiment of the invention.

The two embodiment forms of FIGS. 1 and 2 agree with one another in the following features: A steering spindle 37 has positive rotational connection, in a manner not shown, in each case with a hand steering wheel at one of its ends and a steering worm 4 (worm 4 schematically represented twice in the Figures) at the other end. The steering worm 4 is, in turn supported in an operating cylinder 34 of a steering servo-motor 6 so that it can be rotated but not displaced axially and is connected with a steering nut 35 so that it can execute a screwing movement. The steering nut 35 is supported so that it can rotate but cannot be displaced axially in an operating piston 33, which subdivides the operating cylinder 34 into two operating pressure chambers 13 and 14, which operating piston 33 is in drive connection in conventional manner with the drop arm of the vehicle steering system.

The steering nut 35 is equipped on its outer periphery with a radial control protrusion 36 rigidly connected to it, which radial control protrusion operates a valve setting element 8, embodied as an axial slide, of a control valve 5. Two valve connections 15 and 16 of the control valve 5 are each connected via a pressure connection 38 or 39, respectively, to an associated operating pressure chamber 13 or 14, respectively. Two other valve connections 40 and 41 of the control valve 5 are connected to a return flow line 22 used as pressure medium return, which return flow line leads to a pressure medium reservoir 42. A pressure pump 17 extracting from the reservoir 42 is connected via its supply pressure line 43 to a further valve connection 44 of the control valve 5.

The valve setting element 8 is equipped with two control land pairs 45 and 46, by means of which it is possible to set at the operating piston 33 either pressure equilibrium for straight line travel or a differential pressure force, which supports the current steering deflection, by throttling or shutting off corresponding valve passages between the valve connections 15 and 16 on the one side and the valve connections 40, 41 and 44 on the other side. The end surfaces of the valve setting element 8 are used as the corresponding reaction pressure surfaces 11 and 12, which are located in correspondingly formed reaction pressure chambers 9 and 10, respectively, which are rigidly positioned with respect to the valve housing 23 of the control valve 5.

The control land pairs 45 and 46 are maintained in their neutral position (shown)—in which both valve connections 15 and 16 are connected to both the supply pressure line 43 and the return line 22—by a centering spring 47, which is supported between stop washers 48 and 49. The stop washers 48 and 49 operate in conjunction with end stops 50 and 52 on the valve setting element 8 on the one side and with end stops 51 and 53 on the valve housing 23 on the other.

In the case of a steering deflection in accordance with the arrow direction 3, the valve setting element 8 is so deflected out of its neutral position by the control protrusion 36 after the preloading force of the centering spring 47 has been overcome, that a higher pressure occurs at the valve connection 15, and hence in the operating pressure chamber 13, than at the valve connection 16 and in the operating pressure chamber 14. So that a feedback can be felt at the hand steering wheel, the reaction pressure surface 11, which is effective in the opposite direction to the arrow direction 3, is subjected to a reaction pressure. For this purpose, the associated reaction pressure chamber 9 is in connection with the effective operating pressure chamber 13 via a pressure connection 20 containing a throttle 18. In alternate preferred embodiments this connection can also be produced while bypassing the control valve 5 according to the dotted pressure connection 20a with throttle 18a.

In order—for example at higher travelling speeds—to make it possible to set a higher reaction pressure, the reaction pressure chamber 9 is also connected to a valve connection 54 of a modulating valve 7, with which a further valve connection 55 is, during the deflection of the valve setting element 8 mentioned, connected to the return line 22 in a manner which is further described below. The modulating valve 7 produces a pressure drop between the reaction pressure chamber 9 and its valve connection 55 as a function of the travelling speed.

With the use of a separate modulating valve 7 for each of the reaction pressure chambers 9 and 10, according to other non-illustrating preferred embodiments, corresponding to the power steering system according to the known type of German Patent Specification No. 1,040,392, the valve connection can also be connected directly to the return line 22.

Figure 2:
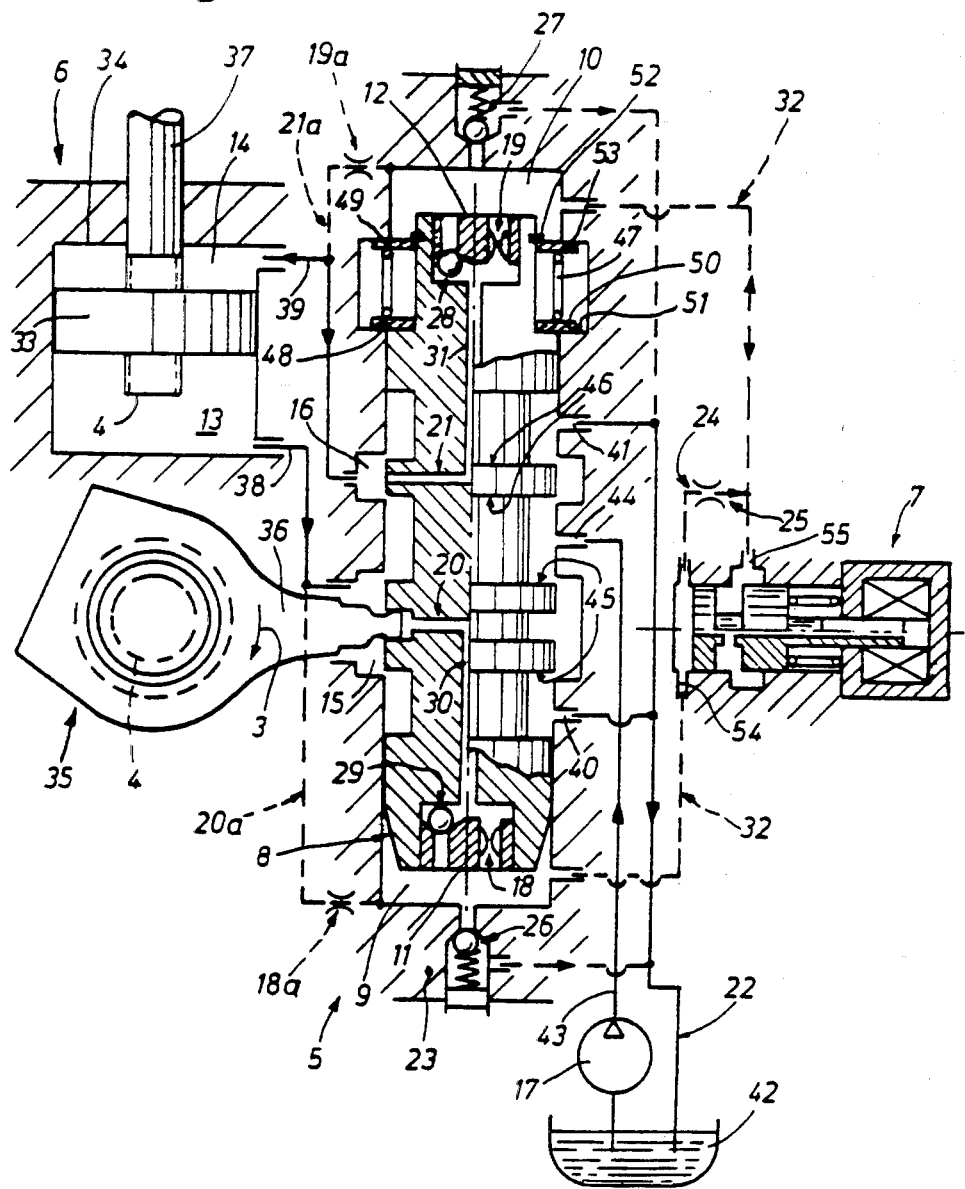
FIG. 2 is a hydraulic block circuit diagram of a power steering system constructed according to a second preferred embodiment of the invention.

In the case of both embodiment forms of FIGS. 1 and 2, however, a common modulating valve 7 is used for both reaction pressure chambers 9 and 10, because the reaction pressure chamber 10 not associated with the steering deflection 3 is connected by a pressure connection 21 (otherwise similar in function to the pressure connection 20 and containing a valve 19)—which can also be disposed in an alternate arrangement corresponding to the pressure connection 21a, shown dotted, with throttle 19a, thus bypassing the control valve 5—to the operating pressure which, in turn, is in at least throttle connection with the return line 22 via the control land pair 46. With this arrangement, therefore, the throttle 19, which with the operating pressure chamber 14 is effectively connected—i.e. with steering deflection in opposition to the arrow direction 3—is used for the proportional derivation of the output pressure in the reaction pressure chamber 10 from the operating pressure, is inserted between the connection 55 of the modulating valve 7 and the return line 22.

In order to attain short fluid pressure paths, a pressure duct 30 or 31 in the valve setting element 8, which pressure duct leads to the associated valve connection 15 or 16, respectively, is used for each of the pressure connections 20 and 21.

The common modulating valve 7 is inserted together with its valve connections 54 and 55 in a short-circuit pressure connection 32, which connects the reaction pressure chambers 9 and 10 to one another, so that with alternative steering deflection at the valve connections 54 and 55, alternating reaction pressure or return pressure occurs.

Finally, both embodiment forms of FIGS. 1 and 2 are similar in providing that the modulating valve 7 is connected in parallel with a bypass throttle connection 25 containing a throttle 24.

The two embodiment forms differ initially in the measures employed for limiting the manual force by their use of pressure limiting valves for the reaction pressure.

In the case of the embodiment form of FIG. 1, the two reaction pressure chambers 9 and 10 are connected to one another by means of a bypass short-circuit connection 56 bypassing the modulating valve 7 and the throttle 24 and two pressure limiting valves 26 and 27 operating in opposition are inserted in the short-circuit connection 56. In this arrangement, the throttle 19 or 18 of the currently ineffective reaction pressure chamber 10 or 9, respectively, is still located between the currently operating pressure limiting valve 26 or 27, respectively, and the return line 22. The pressure limiting valves 26 and 27 in the embodiment form of FIG. 2 are connected directly to the return line 22.

FIG. 2 shows a shut-off valve arrangement 28 or 29 parallel to the throttle 19 or 18, respectively, of the reaction pressure chamber 10 or 9, respectively, each arranged downstream of the return, this arrangement being also usable in the embodiment form of FIG. 1 according to other contemplated embodiments. Each shut-off valve arrangement 28 or 29 closes initially under the influence of the operating pressure of the connected valve connection 15 or 16, respectively, for the associated steering deflection. The shut-off valve arrangement connected with each of the reaction pressure chambers 9 or 10 inserted after the return line 22 is, however, controllable, in a manner not shown, so that the characteristic of the throttle 18 or 19 connected in parallel downstream of the return is variable.

Figure 3:
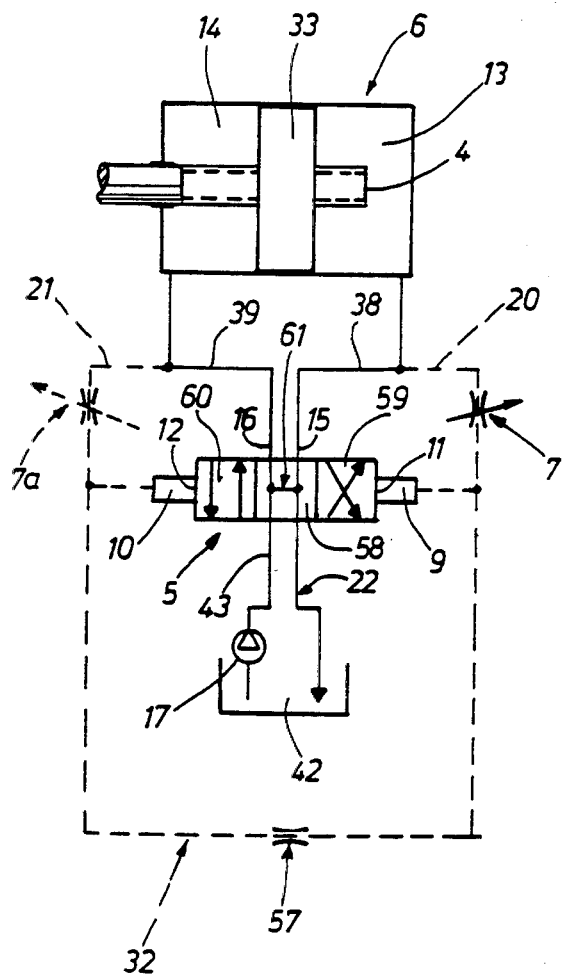
FIG. 3 is a hydraulic block circuit diagram of a power steering system constructed according to a third preferred embodiment of the invention.

In the embodiment form of FIG. 3, those features for which all three illustrated embodiment forms are in agreement, also carry the corresponding reference numbers already used, so that reference can also be made to the appropriate parts of the description of the other Figures.

In FIG. 3 the operating pressure chambers 13 and 14 of the steering system servo-motor 6 are each connected via a pressure connection 38 or 39 to the associated valve connection 15 or 16, respectively, of the control valve 5, which responds to angular deflections of a manual steering wheel (steering worm 4) and is connected via a supply pressure line 43 containing a pressure pump 17 and via a return line 22, which is substantially relieved of pressure, to a pressure medium reservoir 42.

The control valve has a so-called "open center 61" in its neutral position 58, i.e. all four connected lines 22, 38, 39 and 43 are connected to one another, so that pressure equilibrium exists at the operating piston 33, on the one hand, and also, on the other hand, at the reaction pressure surfaces 11 and 12 in the reaction pressure chambers 9 and 10 of the control valve 5—which chambers are each connected by means of a pressure connection 20 or 21, respectively, to one of the operating pressure chambers 13 or 14, respectively.

The reaction pressure chambers 9 and 10 are connected to one another by means of a short-circuit pressure connection 32 containing a throttle 57. A modulating valve 7 operating as a function of at least one parameter, in particular the travelling speed, sets the flow rate of the throttle 57 and is, for this purpose, inserted in one of the pressure connections 20 and 21, in the pressure connection 20 in the example shown.

On deflection of the control valve 5 into the position 59, the operating pressure chamber 13 is subjected to a higher pressure than the operating pressure chamber 14 and a pressure difference proportional to this is produced at the throttle 57, the magnitude of which can be influenced by the modulating valve 7. Because of the pressure difference at the throttle 57, a reaction pressure is built up in the reaction pressure chamber 9, which reaction pressure produces a reaction pressure force on the reaction pressure surface 11, which can be felt at the manual steering wheel.

If the modulating valve 7 operates as a function of the travelling speed, it is intrinsically desirable that the reaction should be greater at higher travelling speeds than at lower travelling speeds. It is a corollary to this that the flow through the modulating valve 7—i.e. in the pressure connection 20—would be substantially unlimited as the travelling speed tends towards zero, i.e. also during parking with a high requirement for steering assistance, so that under these circumstances the modulating valve 7 would represent an undesirable leakage point, via which the pressure pump 17 would supply substantial leakage quantities back into the reservoir 42 while bypassing the steering system servo-motor 6. Since, however, the modulating valve 7 in quasi-parallel connection with the associated valve connection 15 of the control valve 5 is connected to the operating pressure chamber 13 and the throttle 57 is inserted in the short-circuit pressure connection 32, the modulating valve 7 can, without difficulty, be brought into a shut-off position closing the pressure connection 20 and thus preventing leakages, without this being able to cause blocking of the control valve 5. This is because on deflection of the control valve 5, even with closed modulating valve 7, a volume balance can result between the reaction pressure chambers 9 and 10 via the throttle 57. This effect also occurs if the control valve 5 is deflected in the opposite direction into its position 60, in which the other operating pressure chamber 14 is subjected to the higher pressure. In this case, the throttle 57 is not behind but in front of the modulating valve 7 in the flow path—but nothing changes with respect to the possibility quoted for volume balance or with respect to the function of the modulating valve 7 in determining the pressure difference at the throttle 57. This also applies in the case where the modulating valve 7—as is indicated dotted at 7a—is located in the pressure connection 21 of the other reaction pressure chamber 10.

In a different type of power steering system, it is known from German Offenlegungsschrift No. 2,950,525, (FIG. 10/11) to connect the two reaction pressure chambers, each of which is associated with one steering deflection direction of the manual steering wheel, of the control valve for the operating pressure to one common reaction pressure line only, which reaction pressure line can be subjected to a pressure analogous to the static vehicle loading, in order, in commercial vehicles, to give the driver a feel for the current total vehicle weight.

While I have shown and described several embodiments in accordance with the present invention, it is understood that the same are not limited thereto but are susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. Power steering system comprising:
steering servo-motor means having a pair of oppositely disposed working chambers communicating fluid pressure to respective pressure surfaces of steering assist piston means;
servo-valve means movable in response to the wheel angle position of a hand steering wheel and including means for controlling the supply of fluid pressure to the respective pressure surfaces of the steering assist piston means, said servo-valve means including a movable valve adjusting member and a pair of reaction pressure chambers disposed to apply reaction pressure against the respective movement direction of the valve adjusting member;
respective first and second pressure connections between the respective reaction pressure chambers and the working chambers of the steering assist piston means for communicating reaction pressures back to the steering piston assist means;
a short-circuit pressure connection between the two reaction pressure chambers; and
modulating valve means for modulating the reaction pressure communicated to the working chambers by the first and second pressure connections;
wherein the first and second pressure connections are continuously open and are provided with respective first and second constant throttle means; and
wherein the modulating valve means is connected into the short-circuit pressure connection.

2. Power steering system according to claim 1, wherein the modulating valve means is controlled as a function of vehicle speed.

3. Power steering system according to claim 2, wherein a bypass throttle is disposed in the short-circuit pressure connection.

4. Power steering system according to claim 2, wherein the modulating valve means includes shut off means for shutting off a respective one of said first and second pressure connections at low vehicle travelling speeds.

5. Power steering system according to claim 2, further comprising a pressure medium return which is substantially relieved of pressure, wherein the first and second pressure connections bypass the modulating valve means, and wherein the modulating valve means produces a pressure drop in the associated reaction pressure chamber at least indirectly relative to the pressure medium return.

6. Power steering system according to claim 5, wherein the respective first and second throttle means are inserted between the modulating valve and the pressure medium return.

7. Power steering system according to claim 2, wherein the respective reaction pressure chambers are located so as to be fixed in position relative to the valve housing of the servo-valve means.

8. Power steering system according to claim 1, wherein a bypass throttle connection containing a bypass throttle is connected in parallel with the modulating valve.

9. Power steering system according to claim 2, wherein a bypass throttle connection containing a bypass throttle is connected in parallel with the modulating valve.

10. Power steering system according to claim 2, wherein a valve for limiting the pressure-dependent feedback is connected in parallel with the modulating valve means.

11. Power steering system according to claim 2, wherein a controllable shut-off valve arrangement is connected in parallel with the respective first and second constant throttle means, located between the modulating valve means and the pressure medium return.

12. Power steering system according to claim 2, wherein the respective reaction pressure chambers are connected to the respective working chambers via an associated valve connection of the servo-valve means.

13. Power steering system according to claim 12, wherein the reaction pressure chambers are connected to the associated valve connection by means of a pressure duct in the valve adjusting member which contains the respective first and second constant throttle means.

14. Power steering system according to claim 2, wherein the two reaction pressure chambers, each connected on one side to a respective working chamber, are connected on the other side to one another by means of a short-circuit pressure connection containing the common modulating valve means.

15. Power steering system according to claim 14, characterised in that a shut-off valve arrangement is inserted in the pressure duct of the valve adjusting member.

16. Power steering system according to claim 2, wherein the first and second constant throttle means, located between the modulating valve means and a pressure medium return, are arranged downstream of respective valves for limiting the feedback of the pressure medium.

17. Power steering system according to claim 2, wherein a valve for limiting the feedback of the pressure medium is inserted directly between the reaction pressure chamber and a pressure medium return.

18. Power steering system comprising:
steering servo-motor means having a pair of oppositely disposed working chambers communicating fluid pressure to respective pressure surfaces of steering assist piston means;
servo-valve means movable in response to the wheel angle position of a hand steering wheel and including means for controlling the supply of fluid pressure to the respective pressure surfaces of the steering assist piston means, said servo-valve means including a movable valve adjusting member and a pair of reaction pressure chambers disposed to apply reaction pressure against the respective movement direction of the valve adjusting member;
a pump pressure connection between the pump and the servo-valve means;
respective first and second pressure connections between the respective reaction pressure chambers and the working chambers of the steering assist piston means for communicating reaction pressures back to the steering piston assist means;
a short-circuit pressure connection between the two reaction pressure chambers including at least one constant throttle; and
modulating valve means for modulating the reaction pressure communicated to the working chambers by the first and second pressure connections, said modulating valve means being located in a bypass pressure connection which bypasses the servo-valve means and on the one hand is so connected to the short-circuit pressure connection that one of the reaction pressure chambers is connected via a constant throttle with the modulating valve means;
wherein the bypass pressure connection on the other hand is connected to the pressure connection between the other reaction pressure chamber and the related working chamber.

19. Power steering system according to claim 18, wherein the modulating valve means is controlled as a function of vehicle speed.

20. Power steering system according to claim 19, wherein the modulating valve means includes shut off means for shutting off a respective one of said first and second pressure connections at low vehicle travelling speeds.

21. Power steering system comprising:
steering servo-motor means having a pair of oppositely disposed working chambers communicating fluid pressure to respective pressure surfaces of steering assist piston means;
servo-valve means movable in response to the wheel angle position of a hand steering wheel and including means for controlling the supply of fluid pressure to the respective pressure surfaces of the steering assist piston means, said servo-valve means including a movable valve adjusting member and a pair of reaction pressure chambers disposed to apply reaction pressure against the respective movement direction of the valve adjusting member;
a pump pressure connection between a pump and the servo-valve means;
respective first and second pressure connections between the respective reaction pressure chambers and the working chambers of the steering assist piston means for communicating reaction pressures back to the steering piston assist means;
a short-circuit pressure connection between the two reaction pressure chambers including at least one constant throttle; and
modulating valve means for modulating the reaction pressure communicated to the working chambers by the first and second pressure connections, said modulating valve means being located in a bypass pressure connection which bypasses the servo-valve means and is so connected to the short-circuit pressure connection that one of the reaction pressure chambers is connected via a constant throttle with the modulating valve means;
wherein both pressure connections between the respective reaction pressure chambers on the one hand and the corresponding working chambers on the other hand are essentially continuously opened, and wherein the modulating valve means which is connected into one of these two pressure connections serves as a modulating pressure connection and is only blocked in the still standing position of the modulating valve means.

22. Power-steering system according to claim 21, wherein one of the reaction pressure chambers is connected to the pressure connection containing the modulating valve without throttling and wherein the other reaction pressure chamber is connected to the modulating valve means via the constant throttle.

23. Power-steering system according to claim 21 wherein the other reaction pressure chamber is connected to the modulating valve via only the constant throttle.

* * * * *

UNITED STATES PATENT AND TRADEMARK OFFICE
CERTIFICATE OF CORRECTION

PATENT NO. : 4,531,602
DATED : July 30, 1985
INVENTOR(S) : Arno Roehringer

It is certified that error appears in the above-identified patent and that said Letters Patent is hereby corrected as shown below:

Column 10, line 13, change "of" (1st occurance) to --for--.

Abstract, line 11, change "rection" to --reaction--.

Signed and Sealed this

Twenty-sixth Day of November 1985

[SEAL]

Attest:

Attesting Officer

DONALD J. QUIGG

Commissioner of Patents and Trademarks